No. 828,613. PATENTED AUG. 14, 1906.
F. A. LANE.
MILKING MACHINE.
APPLICATION FILED JAN. 12, 1906.
2 SHEETS—SHEET 1.
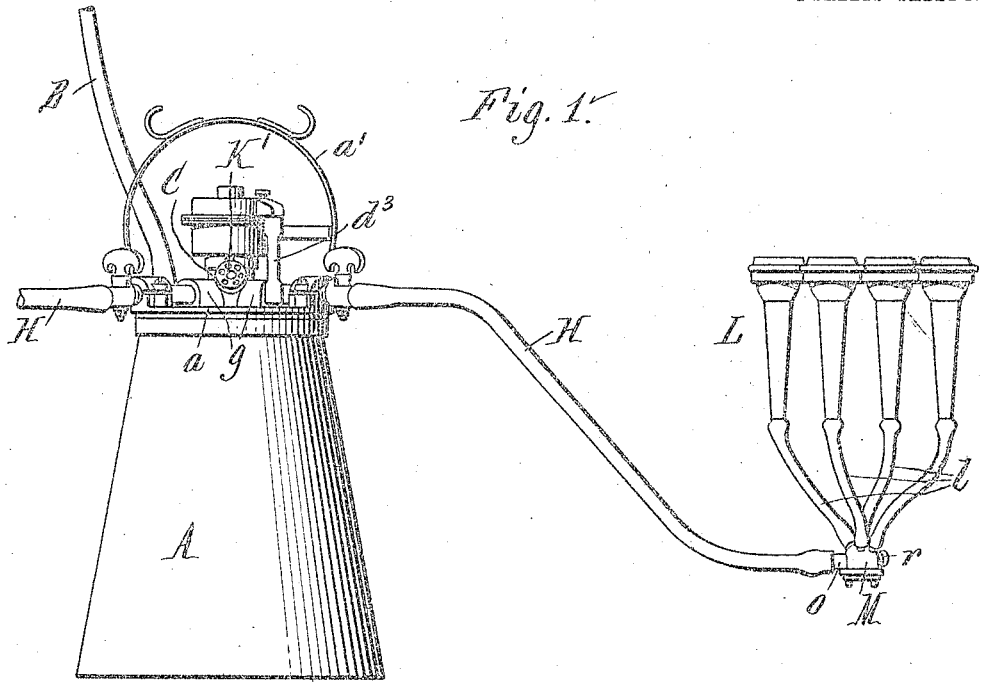
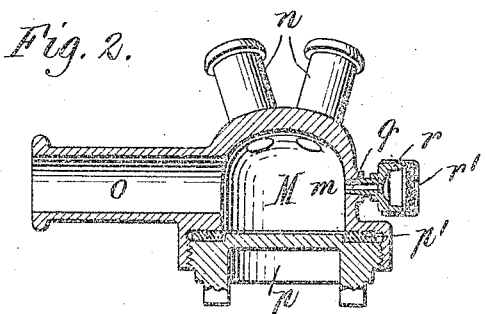
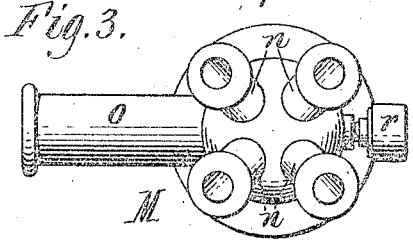
Witnesses:—
E. A. Volk.
R. W. Runser.
Inventor,
Frederic A. Lane
By Wilhelm, Parker & Hard
Attorneys.

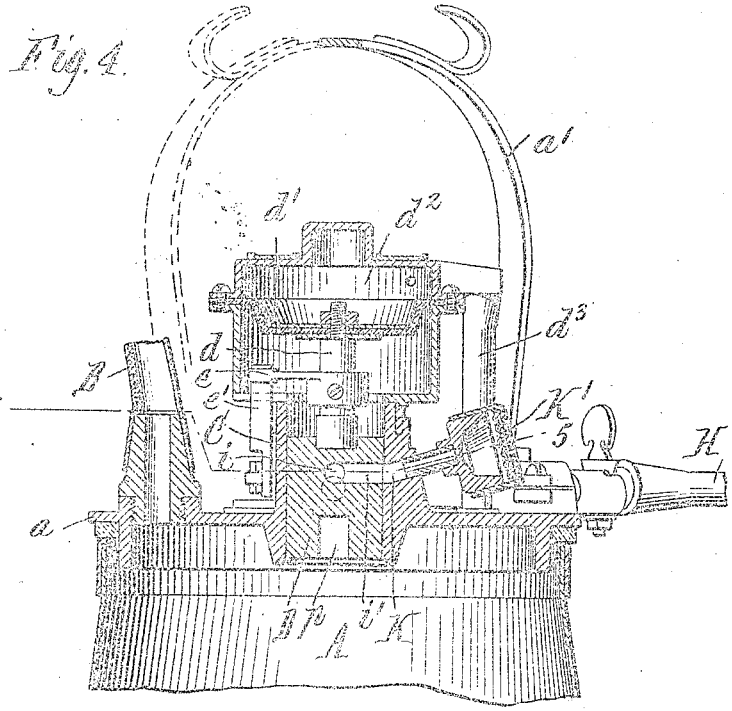
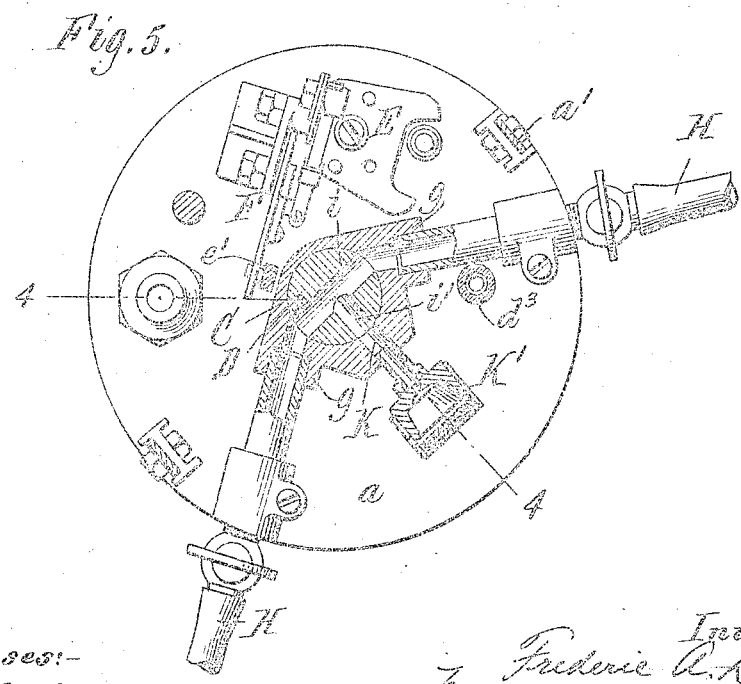

UNITED STATES PATENT OFFICE.

FREDERIC A. LANE, OF LITTLE FALLS, NEW YORK, ASSIGNOR TO D. H. BURRELL & COMPANY, OF LITTLE FALLS, NEW YORK.

MILKING-MACHINE.

No. 828,613.  Specification of Letters Patent.  Patented Aug. 14, 1906.

Application filed January 12, 1906. Serial No. 295,717.

*To all whom it may concern:*

Be it known that I, FREDERIC A. LANE, a citizen of the United States, residing at Little Falls, in the county of Herkimer and State of New York, have invented a new and useful Improvement in Milking-Machines, of which the following is a specification.

This invention relates mainly to that class of milking-machines in which several teat-cups are connected with a main milk-tube by a manifold coupling or connector and in which the milk-passages are acted upon by vacuum pulsations.

One object of this invention is to improve the construction of the connector or coupling with a view of rendering the same simple in construction and easily accessible for cleaning.

Other objects of the invention are to provide means for admitting air to the connector for relieving the vacuum and to prevent objectionable substances from entering the milk-passages with the air.

In the accompanying drawings, Figure 1 is an elevation of a milking-machine embodying my improvements, the figure showing one of the sets of teat-cups connected with the pulsator. Fig. 2 is a vertical section, on an enlarged scale, of the connector or coupling between the teat-cups and the main milk-pipe. Fig. 3 is a plan view of the connector. Fig. 4 is a vertical section of the pulsator and connecting parts in line 4 4, Fig. 5. Fig. 5 is a horizontal section in line 5 5, Fig. 4.

Like letters of reference refer to like parts in the several figures.

A represents the body of the milk pail or receptacle, $a$ the cover thereof, upon which the pulsator is mounted, and $a'$ the usual bail or handle.

B represents the main suction-tube, which leads to the exhaust-tank or other apparatus by which the suction is applied to the vessel.

The pulsator may be of any suitable construction, that shown in the drawings being constructed as follows: C represents the upright cylinder of the pulsator formed centrally on the cover $a$ of the milk vessel, and D the piston-valve arranged to move up and down in this cylinder. $d$ represents the rod which connects this valve with the flexible diaphragm $d'$, forming the bottom of the exhaust-chamber $d^2$. The latter is connected with the cover $a$ by a pipe $d^3$, which is alternately placed in communication with the exhausted interior of the pail or the external air by a reversing-valve E, which is operated from the piston-valve by an arm $e$, depending rod $e'$, and spring mechanism F. The latter may be similar to that which is described and shown in Letters Patent No. 784,780, March 14, 1905. The valve-cylinder C is provided above the cover $a$ on opposite sides with milk-inlet ports or nipples $g$, each of which is connected in any suitable way with the main milk-tube H. The piston or pulsator valve D is provided in its upper portion with a transverse air-port $i$, suitable for connecting with both milk-ports $g$ of the valve-cylinder, and with a radial port $i'$, which extends from the transverse port $i$ to the side of the valve. In the lower position of the piston-valve the port $i'$ connects with an air-inlet port K, formed in the side of the valve-cylinder C above the cover $a$. The valve is provided with lateral recesses $p$ for placing the milk-ports $g$ in communication with the exhausted interior of the milk vessel in the upper position of the piston-valve.

When the piston or pulsator valve is in its upper position, the air-ports $i\ i'$ of the valve are out of register with the air-inlet port K of the valve-cylinder and the recesses $p$ of the valve are in register with the milk-ports $g$ of the cylinder, so that the suction which is applied to the milk vessel acts through the ports $g$ upon the milk-pipes H and the milk passes through said pipes, ports $g$, and the recesses of the valve D into the milk vessel. When the pulsator-valve is in its lower position, the milk-ports $g$ are closed by the valve, the suction is cut off from these ports and from the milk-pipes H, the air-ports $i\ i'$ of the valve are in register with the air-inlet port K and the milk-ports $g$ of the valve-cylinder, and the external air is admitted to the milk-pipes H, whereby the vacuum in the same is relieved. The air-inlet opening in the valve-cylinder is of such a restricted area with reference to the capacity of the milk-passages that the volume of air which is admitted to these parts while the valve remains in its lower position reduces the partial vacuum to a considerable extent, but not so low that the teat-cups are liable to drop from the teats.

In order to prevent objectionable matters from entering the milk-spaces with the air, the air-inlet opening K is guarded by a filter K', through which the air is compelled to pass.

L represents the teat-cups, which may be of any suitable construction and are provided at their lower ends with individual passages or pipes $l$, which connect with the connector or manifold coupling M, which is interposed between the cups and the main milk-pipe H. The connector M comprises a chamber $m$, having in its top portion upwardly-projecting nipples or attaching devices $n$, to which the individual cups are connected by the passages or pipes $l$, and having in its bottom portion a lateral nipple or attaching device O, to which the main milk-pipe H is connected. The chamber $m$ is provided below the lateral nipple with a removable bottom $p$, preferably secured by a screw-thread, a packing-washer $p'$ being interposed between the bottom and the chamber. Upon removing the bottom the interior of the chamber and the nipples are fully exposed, so that these parts can be readily cleaned without disturbing the connection of the pipes with the nipples. The pulsations are applied to the chamber by the lateral nipple O and are equalized by the chamber upon the several nipples $n$, which connect with the teat-cups, so that all of the cups operate alike both during the suction action and during the relieving action, thereby avoiding excessive action of the cups which are located nearest the lateral nipple or imperfect action of the cups which are located farthest from the lateral nipple.

$q$ represents an air-inlet formed in the chamber $m$ of the connector for admitting a restricted volume of air to the same and to the milk-passages connected therewith. This inlet is of such a restricted area with reference to the milk-passages that the volume of air entering through this inlet is insufficient to materially affect the suction action when suction is applied to the milk-passages, but is sufficient to considerably reduce the partial vacuum in the milk-passages when the suction is cut off from the same. The air-inlet in the connector furnishes a constant but restricted supply of air to the milk-passages. When the suction is cut off by the pulsator, the air so supplied to the milk-passages rapidly relieves the vacuum in the same. This air is admitted near the teat-cups and enters the milk-pipe $m$ in the direction in which the milk flows through the same, thereby promoting the flow of the milk through the milk-pipe to the pail and preventing the surging of the milk toward the teat-cups and keeping the pipe clear of milk.

With milk-pipes and teat-cups of ordinary dimensions air-inlets of about one-twentieth of an inch in diameter in the connector and in the pulsator-cylinder will produce good results and will reduce the partial vacuum during the relief period to from one to two inches of mercury, while the air which is admitted does not materially affect the suction action. The air-inlet in the connector may be used without an air-inlet in the pulsator, if desired. The constant admission of a restricted volume of air at the connector involves a little waste in requiring a corresponding increase of work by the exhaust apparatus; but this is compensated for by the improved operation of the mechanism and by its greater simplicity, the milking proceeding faster and better and the milk-tubes and passages being kept clean of milk.

The air-inlet in the connector is preferably protected by a filter-casing $r$, which contains cotton or some other suitable material $r'$ for intercepting dust and other objectionable ingredients which may be contained in the air.

I claim as my invention—

1. In a milking-machine, the combination with teat-cups and a milk-pipe, of an interposed connector comprising a body which is open at the bottom, a bottom removably secured in the bottom opening of the body, a lateral attaching device for the milk-pipe formed on said body above the bottom opening thereof, and individual attaching devices for said cups formed on the top of said body, the interior of said attaching devices being directly accessible upon removing said bottom, substantially as set forth.

2. In a milking-machine, the combination of a milk-pipe, teat-cups, and a connector interposed between said pipe and said cups and provided with a restricted air-inlet through which air is constantly admitted to the connector and the milk-passages connected therewith, substantially as set forth.

3. In a milking-machine, the combination of a milk vessel, a pulsator on the same, a milk-pipe connected with the pulsator, teat-cups connected with the milk-pipe, an air-inlet which is placed periodically in communication with the milk-pipe by the pulsator, and an air-inlet which admits air constantly to the milk-pipe, substantially as set forth.

4. In a milking-machine, the combination of a milk vessel, a milk-pipe connected therewith, teat-cups connected with the milk-pipe, and air-inlet devices adapted to admit air to both ends of the milk-pipe, substantially as set forth.

5. In a milking-machine, the combination of a milk vessel, a milk-pipe connected therewith, teat-cups, a connector interposed between the cups and the pipe and provided with an air-inlet which is constantly open, and a pulsator provided with an air-inlet which is periodically placed in communication with the milk-pipe, substantially as set forth.

Witness my hand this 3d day of January, 1906.

FREDERIC A. LANE.

Witnesses:
CHAS. B. DALZELL,
LOOMIS BURRELL.